(12) United States Patent
Holland (10) Patent No.: US 11,713,681 B1
(45) Date of Patent: Aug. 1, 2023

(54) FAN BLADE REPAIR SYSTEMS AND METHODS

(71) Applicant: Raytheon Technologies Corporation, Farmington, CT (US)

(72) Inventor: Brian K. Holland, Mason, MI (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 0 days.

(21) Appl. No.: 17/747,312

(22) Filed: May 18, 2022

(51) Int. Cl.
  *F01D 5/14* (2006.01)

(52) U.S. Cl.
  CPC .......... *F01D 5/147* (2013.01); *F05D 2230/80* (2013.01)

(58) Field of Classification Search
  CPC ...... F01D 5/005; F01D 5/147; F05D 2230/80; F05D 2240/307; F05D 2240/31
  See application file for complete search history.

(56) References Cited

U.S. PATENT DOCUMENTS

| | | | |
|---|---|---|---|
| 4,818,833 A | 4/1989 | Formanack et al. | |
| 4,851,188 A | 7/1989 | Schaefer et al. | |
| 5,603,603 A | 2/1997 | Benoit et al. | |
| 6,194,086 B1 | 2/2001 | Nenov et al. | |
| 6,872,048 B2 * | 3/2005 | Uselton | F04D 29/384 416/235 |
| 10,794,394 B2 * | 10/2020 | Strock | F01D 5/288 |
| 10,995,623 B2 | 5/2021 | Sippel et al. | |
| 11,143,047 B2 * | 10/2021 | Guivarc'h | F01D 5/282 |
| 11,365,632 B2 * | 6/2022 | Strock | F01D 5/14 |
| 2005/0129511 A1 | 6/2005 | Allen | |
| 2020/0360998 A1 | 11/2020 | Mittendorf et al. | |
| 2022/0243592 A1* | 8/2022 | Namba | F01D 5/288 |

FOREIGN PATENT DOCUMENTS

EP 0484115 5/1992

* cited by examiner

*Primary Examiner* — Courtney D Heinle
*Assistant Examiner* — Danielle M. Christensen
(74) *Attorney, Agent, or Firm* — Snell & Wilmer L.L.P.

(57) ABSTRACT

A method of repairing a tip of an airfoil can comprise: removing a coating from the tip of the airfoil; preparing a repair area for bonding, the repair area including the tip and a portion of a concave side of the airfoil; applying an epoxy film and an abrasive component to the repair area; and bonding the epoxy film and the abrasive component to the repair area.

21 Claims, 11 Drawing Sheets

FAN BLADE REPAIR SYSTEMS AND METHODS

FIELD

The present disclosure relates generally to repair systems and methods, and more particularly to, repair systems and methods for a tip of an airfoil of a fan blade.

BACKGROUND

Gas turbine engines (such as those used in electrical power generation or used in modern aircraft) typically include a fan section. The fan section can include a fan blade configured to drive air along a path of bypass airflow. A fan case is typically disposed radially outward from the fan blade. A liner can be disposed on a radially inner surface of the fan case to provide an abradable surface designed to wear from fan blades in order to minimize the airflow around the blades, thus improving the efficiency of the fan. Over time, a coating that is disposed radially adjacent to the liner wears due to contact with the liner. Repairing the coating of at a maintenance interval can be costly and time consuming.

Typically, tips of fan blades are coated with plasma spray to create an abrasive surface for carving the abradable. The plasma spray is applied during manufacturing; however, at a maintenance interval, re-applying plasma spray could be overly costly and time consuming.

SUMMARY

A method of repairing a tip of an airfoil is disclosed herein. In various embodiments, the method comprises: removing a coating from the tip of the airfoil; preparing a repair area for bonding, the repair area including the tip and a portion of a concave side of the airfoil; applying an epoxy film and an abrasive component to the repair area; and bonding the epoxy film and the abrasive component to the repair area.

In various embodiments, applying the epoxy film and the abrasive component comprises disposing the epoxy film between the repair area and the abrasive component.

In various embodiments, the epoxy film and the abrasive component have a substantially similar shape prior to applying the epoxy film and the abrasive component to the repair area.

In various embodiments, the epoxy film comprises a carrier layer disposed between adhesives.

In various embodiments, the abrasive component comprises a backing sheet and an abrasive grain.

In various embodiments, the abrasive component comprises an emery cloth.

In various embodiments, bonding the epoxy film and the abrasive component comprises vacuum bagging the repair area.

A method of coupling an abrasive component to a tip of an airfoil is disclosed herein. In various embodiments, the method comprises: applying an epoxy film and the abrasive component to the tip of the airfoil, the epoxy film having a first shape defined by a tip panel and a plurality of flaps extending outward from a concave edge of the tip panel, the tip panel disposed between the tip and the abrasive component; folding the plurality of flaps of the epoxy film over a concave side of the airfoil; and bonding the abrasive component to the airfoil via the epoxy film.

In various embodiments, the first shape further comprises a second plurality of flaps extending outward from a convex edge of the tip panel. The method can further comprise folding the second plurality of flaps over a convex side of the airfoil.

In various embodiments, the abrasive component comprises a second shape, and wherein the second shape is substantially similar to the first shape.

In various embodiments, bonding the abrasive component to the airfoil further comprises curing the epoxy film.

In various embodiments, the method can further comprise cutting the epoxy film into the first shape based on a template. The method can further comprise cutting the abrasive component into a second shape based on the template, wherein the second shape is substantially similar to the first shape.

A repaired airfoil is disclosed herein. In various embodiments, the repaired airfoil comprises: an airfoil comprising a metallic body extending from a platform radially outward to a tip, the airfoil defining a concave side and a convex side; an abrasive component comprising a backing sheet and an abrasive grain coupled to the backing sheet; and an epoxy film bonded to the backing sheet of the abrasive component and the tip of the airfoil.

In various embodiments, the epoxy film further comprises a first flap extending over a portion of the concave side, the first flap coupled to the concave side and overlapping a second flap of the abrasive component.

In various embodiments, the epoxy film further comprises a third flap extending over a portion of the convex side, the third flap coupled to the convex side and overlapping a fourth flap of the abrasive component.

In various embodiments, the epoxy film comprises a carrier layer disposed between a first adhesive and a second adhesive. The first adhesive can be disposed between the airfoil and the carrier layer, and wherein the second adhesive is disposed between the carrier layer and the backing sheet.

In various embodiments, the abrasive component comprises an emery cloth.

The forgoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the following detailed description and claims in connection with the following drawings. While the drawings illustrate various embodiments employing the principles described herein, the drawings do not limit the scope of the claims.

DETAILED DESCRIPTION

The following detailed description of various embodiments herein refers to the accompanying drawings, which show various embodiments by way of illustration. While these various embodiments are described in sufficient detail to enable those skilled in the art to practice the disclosure, it should be understood that other embodiments may be realized and that changes may be made without departing from the scope of the disclosure. Thus, the detailed description herein is presented for purposes of illustration only and not of limitation. Furthermore, any reference to singular includes plural embodiments, and any reference to more than one component or step may include a singular embodiment or step. Also, any reference to attached, fixed, connected, or the like may include permanent, removable, temporary, partial, full or any other possible attachment option. Additionally, any reference to without contact (or similar phrases) may also include reduced contact or minimal contact. It should also be understood that unless specifically stated otherwise, references to "a," "an" or "the" may include one or more than one and that reference to an item in the singular may also include the item in the plural. Further, all ranges may include upper and lower values and all ranges and ratio limits disclosed herein may be combined.

As used herein, "aft" refers to the direction associated with the tail (e.g., the back end) of an aircraft, or generally, to the direction of exhaust of the gas turbine. As used herein, "forward" refers to the direction associated with the nose (e.g., the front end) of an aircraft, or generally, to the direction of flight or motion.

Figure 1:
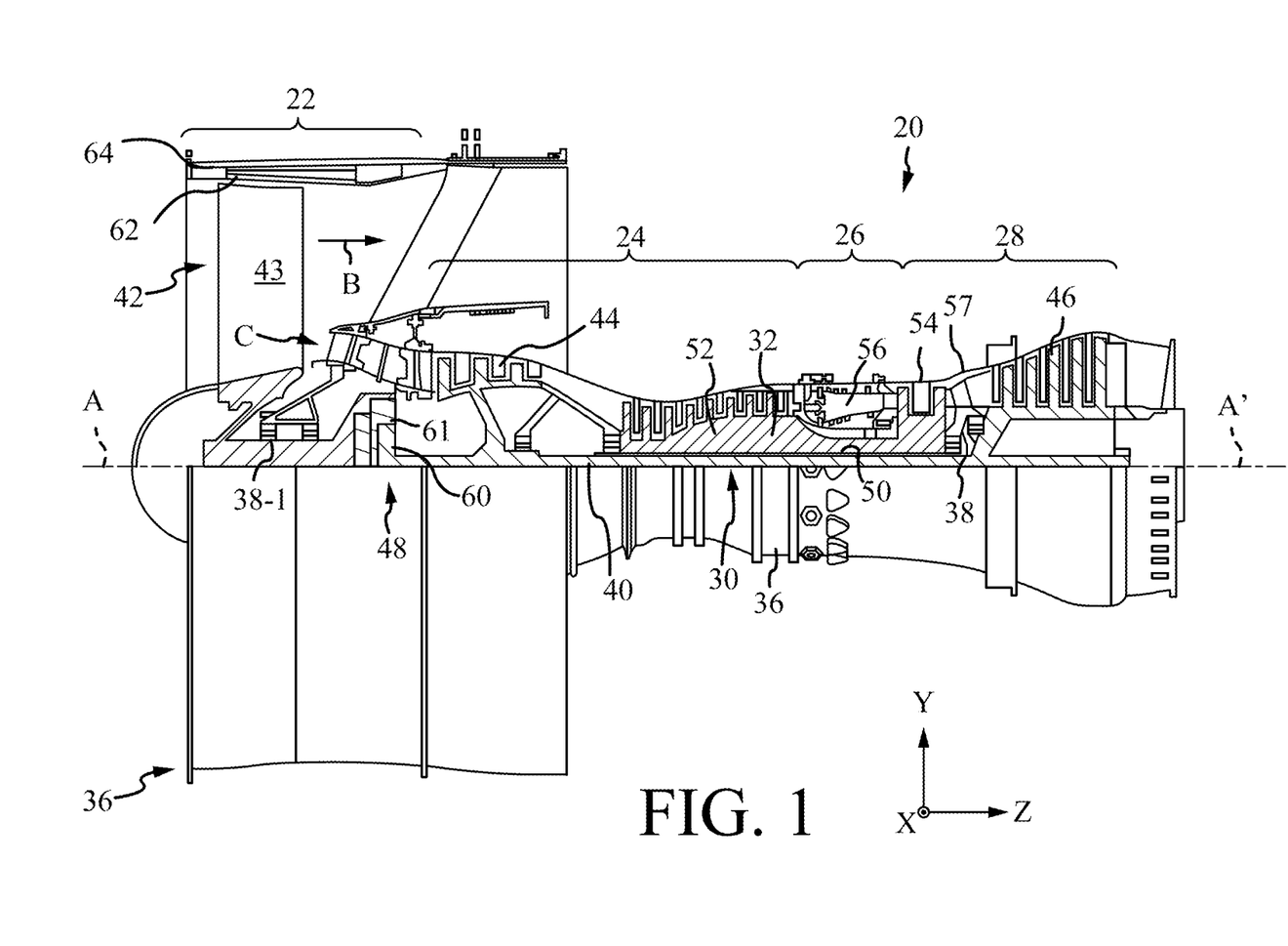
FIG. 1 illustrates a cross-sectional view of a gas-turbine engine, in accordance with various embodiments.

With reference to FIG. 1, a gas turbine engine 20 is shown according to various embodiments. Gas turbine engine 20 may be a two-spool turbofan that generally incorporates a fan section 22, a compressor section 24, a combustor section 26, and a turbine section 28. In operation, fan section 22 can drive air along a path of bypass airflow B while compressor section 24 can drive air along a core flow path C for compression and communication into combustor section 26 then expansion through turbine section 28. Although depicted as a turbofan gas turbine engine 20 herein, it should be understood that the concepts described herein are not limited to use with turbofans as the teachings may be applied to other types of turbine engines including three-spool architectures, single spool architecture or the like.

Gas turbine engine 20 may generally comprise a low speed spool 30 and a high speed spool 32 mounted for rotation about an engine central longitudinal axis A-A' relative to an engine static structure 36 or engine case via several bearing systems 38, 38-1, etc. Engine central longitudinal axis A-A' is oriented in the Z direction on the provided X-Y-Z axes. It should be understood that various bearing systems 38 at various locations may alternatively or additionally be provided, including for example, bearing system 38, bearing system 38-1, etc.

Low speed spool 30 may generally comprise an inner shaft 40 that interconnects a fan 42, a low pressure compressor 44 and a low pressure turbine 46. Inner shaft 40 may be connected to fan 42 through a geared architecture 48 that can drive fan 42 at a lower speed than low speed spool 30. Geared architecture 48 may comprise a gear assembly 60 enclosed within a gear housing 61. Gear assembly 60 couples inner shaft 40 to a rotating fan structure. High speed spool 32 may comprise an outer shaft 50 that interconnects a high pressure compressor 52 and high pressure turbine 54. A combustor 56 may be located between high pressure compressor 52 and high pressure turbine 54. A mid-turbine frame 57 of engine static structure 36 may be located generally between high pressure turbine 54 and low pressure turbine 46. Mid-turbine frame 57 may support one or more bearing systems 38 in turbine section 28. Inner shaft 40 and outer shaft 50 may be concentric and rotate via bearing systems 38 about the engine central longitudinal axis A-A', which is collinear with their longitudinal axes. As used herein, a "high pressure" compressor or turbine experiences a higher pressure than a corresponding "low pressure" compressor or turbine.

The core airflow may be compressed by low pressure compressor 44 then high pressure compressor 52, mixed and burned with fuel in combustor 56, then expanded over high pressure turbine 54 and low pressure turbine 46. Turbines 46, 54 rotationally drive the respective low speed spool 30 and high speed spool 32 in response to the expansion.

In various embodiments, the fan 42 comprises a plurality of a fan blade 43 disposed circumferentially around a hub. The fan blade 43 is spaced apart circumferentially from a liner 62. The liner 62 can be coupled to a radially inner surface of a fan case 64. The fan case 64 can protect the fan 42 during operation and at least partially define a flow path for the bypass airflow B. During operation, without a protective coating applied at a tip of the fan blade 43, the fan 42 may generate too much heat, resulting in degradation of the liner 62.

Figure 2:
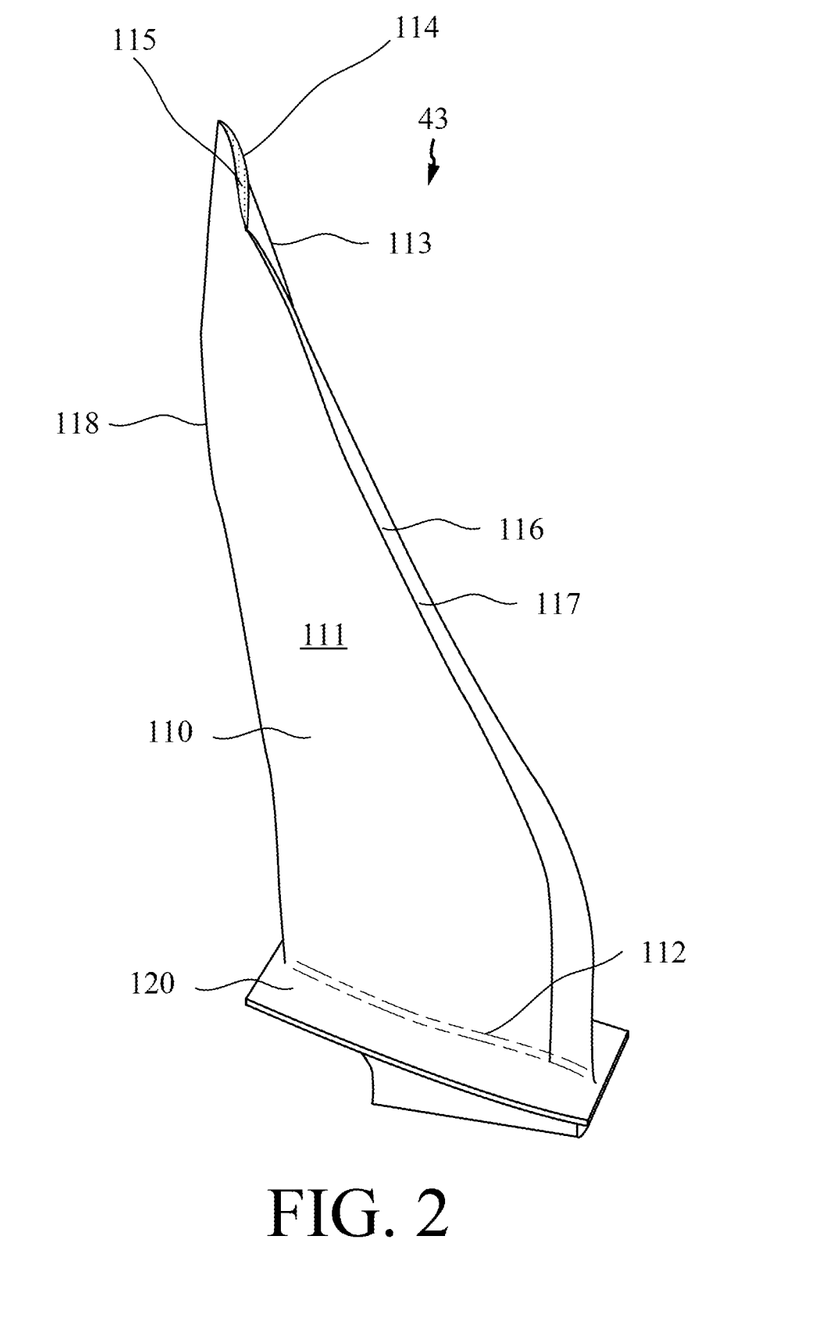
FIG. 2 illustrates a perspective view of a fan blade, in accordance with various embodiments.

Referring now to FIG. 3, a perspective view of a fan blade 43 of the fan 42 from FIG. 1, is illustrated, in accordance with various embodiments. The fan comprises an airfoil 110 extending radially outward from a platform 120. The airfoil 110 comprises a root 112 disposed at a proximal end to the platform 120 and a tip 114 disposed at a distal end to the platform 120. The airfoil 110 further comprises a leading edge 116 disposed forward of a trailing edge 118.

In various embodiments, the leading edge 116 is defined by a leading edge cover 117. The leading edge cover 117 can extend from the root 112 to the tip 114. The leading edge cover 117 can be coupled to a body of the airfoil 110. The airfoil 110 further comprises a concave side 111 (e.g., a pressure side) and a convex side 113 (e.g., a suction side). In various embodiments, the fan blade 43 is configured to rotate in a circumferential direction towards the convex side 113 during operation. In various embodiments, the leading edge cover 117 comprises a metallic component (e.g., a titanium-based component or the like. In this regard, the leading edge cover 117 can be more robust and less susceptible to damage compared to the metallic body, as described further herein.

In various embodiments, the tip 114 comprises a coating 115 disposed thereon. In various embodiments, the coating 115 can comprise a metallic or ceramic-based coating (e.g., a tungsten based coating, a carbide/cobalt based coating, a cubic boron nitride (cBN) coating, etc.). In various embodiments, the coating 115 can be applied to the tip 114 via a plasma spray. A "plasma spray", as referred to herein is a coating process used for coupling the coating 115 to the tip 114 of the airfoil via a combination of high temperature, high energy heat source, a relatively inert spraying medium (e.g., argon, and high particle velocities). Plasma is typically used to describe the gas which is heated to a high enough temperature that it ionizes and becomes electrically conductive.

In various embodiments, during operation, the coating 115 acts as an abrasive component for reducing heat in response to the fan blade 43 forming an initial trench into the liner 62 of the fan case 64 from FIG. 1. In this regard, the coating 115 contacts the liner 62 during initial operation of the gas turbine engine 20 from FIG. 1 to form a trench therein. Once a trench is created, the coating 115 no longer contacts the liner 62 during operation and the fan blade 43 becomes more efficient due to the trench of the liner 62 that is formed due to the coating 115, in accordance with various embodiments.

Figure 3:
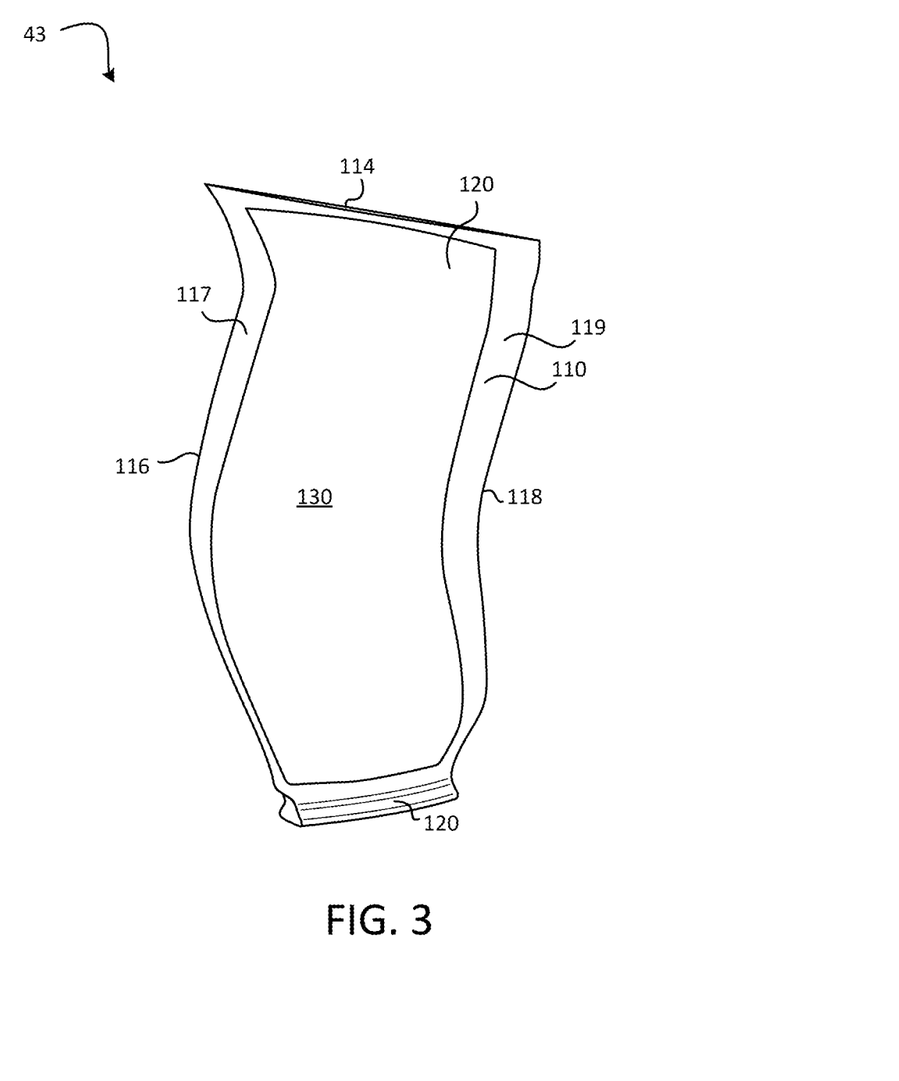
FIG. 3 illustrates a side view of a fan blade, in accordance with various embodiments.

Referring now to FIG. 3, a side view of the fan blade 43 is illustrated, with like numerals depicting like elements, in accordance with various embodiments. In various embodiments, the airfoil 110 further comprises the leading edge cover 117 and a composite cover 130. The leading edge cover 117 and the composite cover 130 can be coupled to a metallic body 119.

It will be noted that fan blades for gas turbine engines may be provided in the variety of sizes, shapes, and geometries. Accordingly, the fan blade 100 of the present disclosure is not limited to the specific geometry, size, and shape shown in the figures. Further, as mentioned above, the disclosed fan blade 100 is not necessarily limited to the fan section 22 of a gas turbine engine 20, but instead may be implemented in other sections of the gas turbine engine 20 and/or may be adapted for use in other types of jet engines, propellers, rotors, etc.

In various embodiments, the metallic body 119 of the fan blade 43 may be fabricated from titanium, titanium alloy, aluminum, or aluminum alloy, among other suitable metallic materials, in accordance with various embodiments. The metallic body 119 may extend from the trailing edge 118 to a leading edge end that interfaces with the leading edge cover 117.

The composite cover 130, according to various embodiments, may comprise any composite material such as carbon fiber, fiber-reinforced polymer (e.g., fiber glass), para-aramid fiber, and/or aramid fiber. In various embodiments, the composite cover 130 may be made from a fiber metal laminate ("FML"). For example, the composite cover 130 may include metal layers comprising titanium and/or a titanium alloy and the composite material layers in the FML may comprise carbon fiber, such as graphite fiber. The combination of a metal layer comprising titanium and a composite material layer comprising carbon fiber may occur because titanium and carbon fiber do not form a galvanic cell, and therefore, galvanic corrosion may not occur. An FML comprising titanium and/or a titanium alloy and graphite fiber is commonly known in the industry as "TiGr." In various embodiments, in which an FML comprises metal layers comprising aluminum and/or an aluminum alloy, the composite material layers in the FML may comprise fiber-reinforced polymer (e.g., fiber glass), para-aramid fiber, and/or aramid fiber. The combination of a metal layer comprising aluminum and a composite material layer comprising fiber glass and/or aramid fiber may occur because aluminum and fiber glass and/or aramid fiber do not form a galvanic cell, and therefore, galvanic corrosion may not occur. An FML comprising aluminum and/or an aluminum alloy and fiber glass is commonly known by the industry standard designation of "GLARE."

Though FMLs described above include specific examples of metals, metal alloys, and/or composite materials, it would not be outside the scope of this disclosure to include any FML comprising any metal, metal alloy, and/or composite material, in any arrangement of layers.

In various embodiments, FML layers and/or stacks of FML layers may be coupled together using an adhesive material. In various embodiments, the adhesive material may comprise, for example, one or more epoxies, bismaleimides, cyanate esters, or polyimides, and may be a supported or unsupported film and/or paste. A supported adhesive material may comprise a support comprised of nylon, polyester, fiberglass, or glass, which may be woven or non-woven. In various embodiments the adhesive material may comprise an amine cured, toughened epoxy resin system supplied with unidirectional and/or woven carbon or glass fibers.

In various embodiments, the metallic body 119 imparts mechanical strength to the fan blade 43 and the composite cover 130 imparts stiffness to the fan blade 43 and reduces the overall weight of the fan blade 43. The stiffness of the fan blade 43 may be such that adjacent fan blades are prevented from striking each other and/or that detrimental vibratory frequencies are "tuned-out," in accordance with various embodiments. Accordingly, a rotor assembly including the fan blades 43 may be free of shroud elements disposed between adjacent fan blades In various embodiments, the metallic body 119 comprises aluminum. Although described herein as comprising aluminum, the present disclosure is not limited in this regard. For example, fan blades comprising titanium alloys, nickel alloys, stainless steel, or the like are within the scope of this disclosure. In various embodiments, the leading edge cover 117 can provide protection to the metallic body 119 from debris and other foreign objects that may be pulled through the fan section 22 of the gas turbine engine 20 from FIG. 1.

Figure 4:
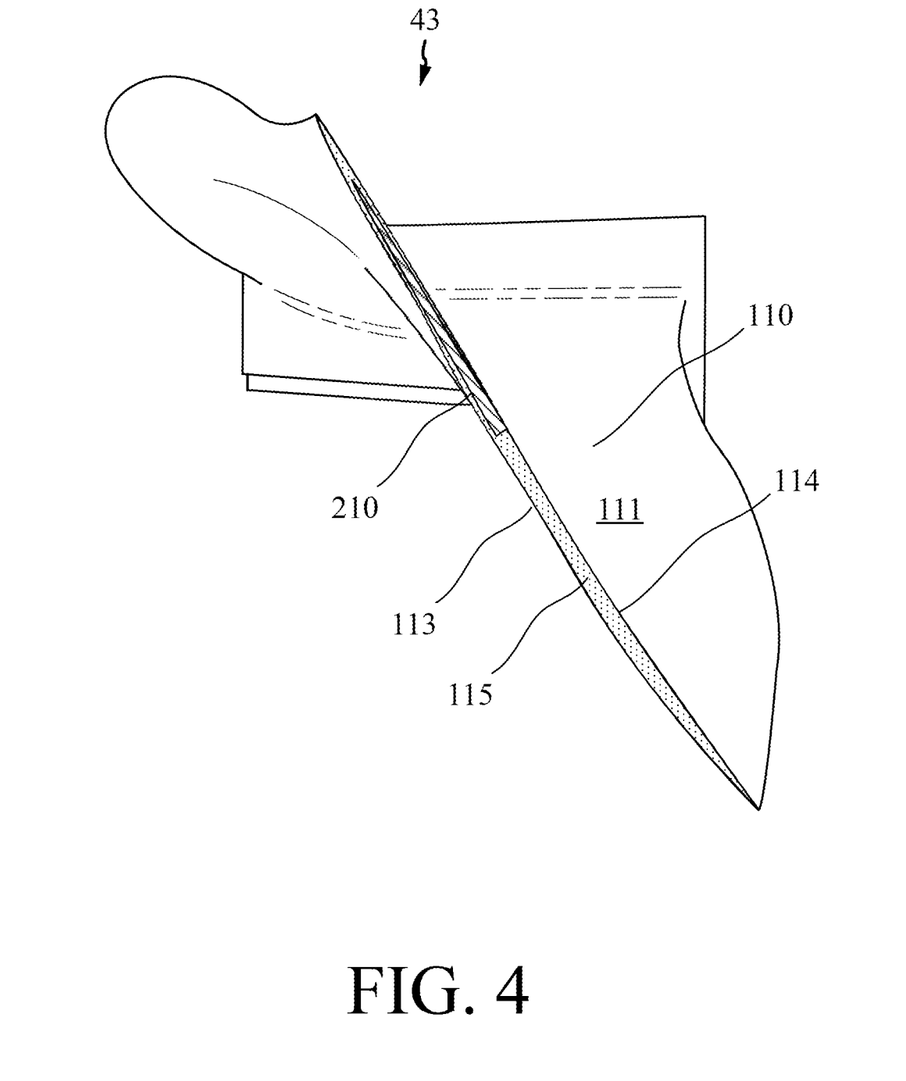
FIG. 4 illustrates a top down view of a fan blade, in accordance with various embodiments.

Referring now to FIG. 4, a top down view of the fan blade 43 at a maintenance interval (e.g., after 2,000 flight cycles, 10,000 flight cycles, 25,000 flight cycles, or the like). In various embodiments, the coating 115 can wear over time resulting in a wear portion 210 forming on the tip 114 of the airfoil 110. In various embodiments, at a maintenance interval, the liner 62 of the gas turbine engine 20 from FIG. 1 can also be replaced. In this regard, the fan blade 43 may have to form a new trench in a newly manufactured liner (e.g., a replacement liner in accordance with the liner 62) as described previously herein.

If the coating 115 were to be removed a re-applied, the composite cover 130 and the leading edge cover 117 from FIG. 3 would have to be removed and replaced in accordance with various embodiments. Removing and replacing the leading edge cover 117 and the composite cover 130 would add significant cost and time for a repair process.

Figure 5:
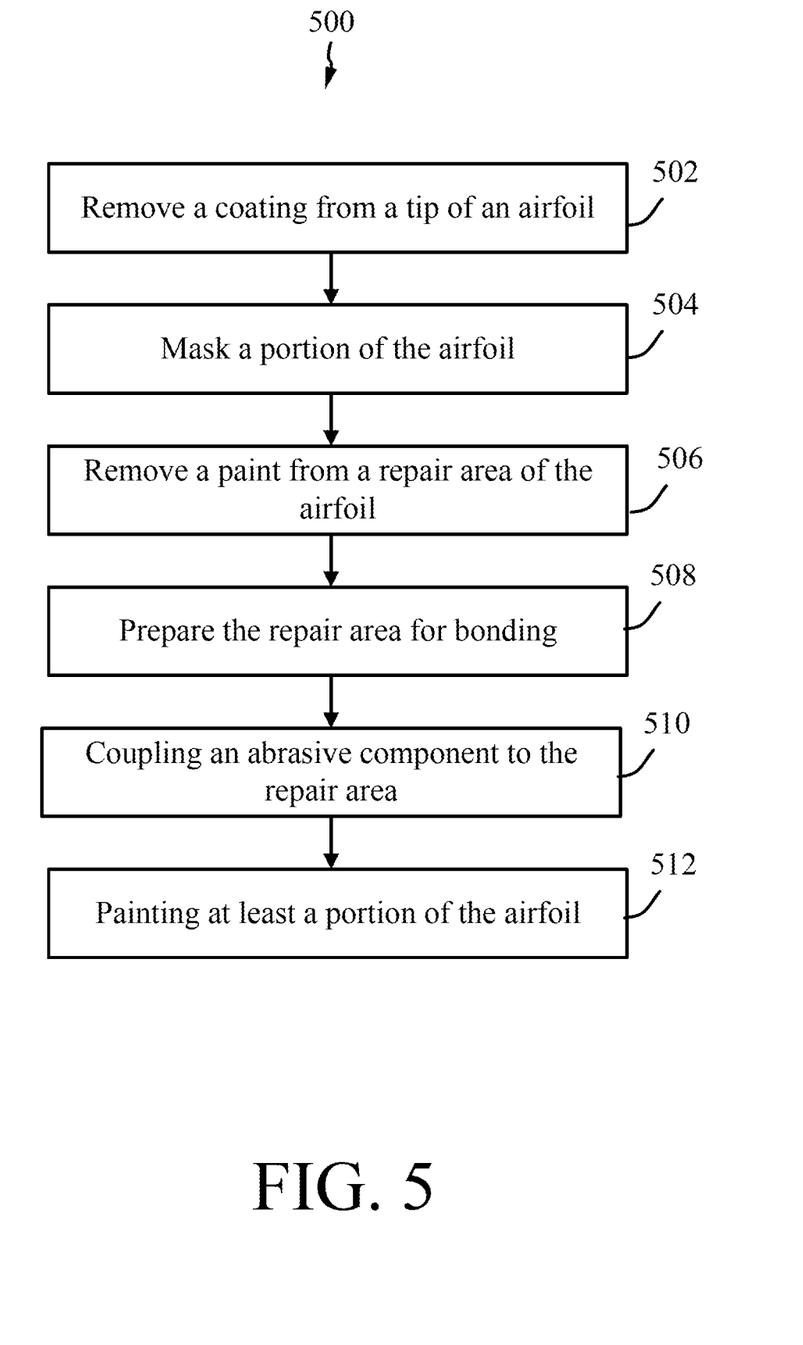
FIG. 5 illustrates a method of repairing a fan blade, in accordance with various embodiments.

Referring now to FIG. 5, a method 500 of repairing a tip 114 of an airfoil 110 is illustrated, in accordance with various embodiments. In various embodiments, the method 500 comprises removing a coating (e.g., coating 115 from FIGS. 2 and 3) from a tip 114 of an airfoil 110 (step 502). The coating can be removed by a subtractive component (e.g., a mill from a computer numerical control (CNC)

machine or the like). Although described as utilizing a mill, any subtractive component can be utilized and be within the scope of this disclosure, such as a lathe, cutters, reamers, drill bits, etc.

Figure 6:
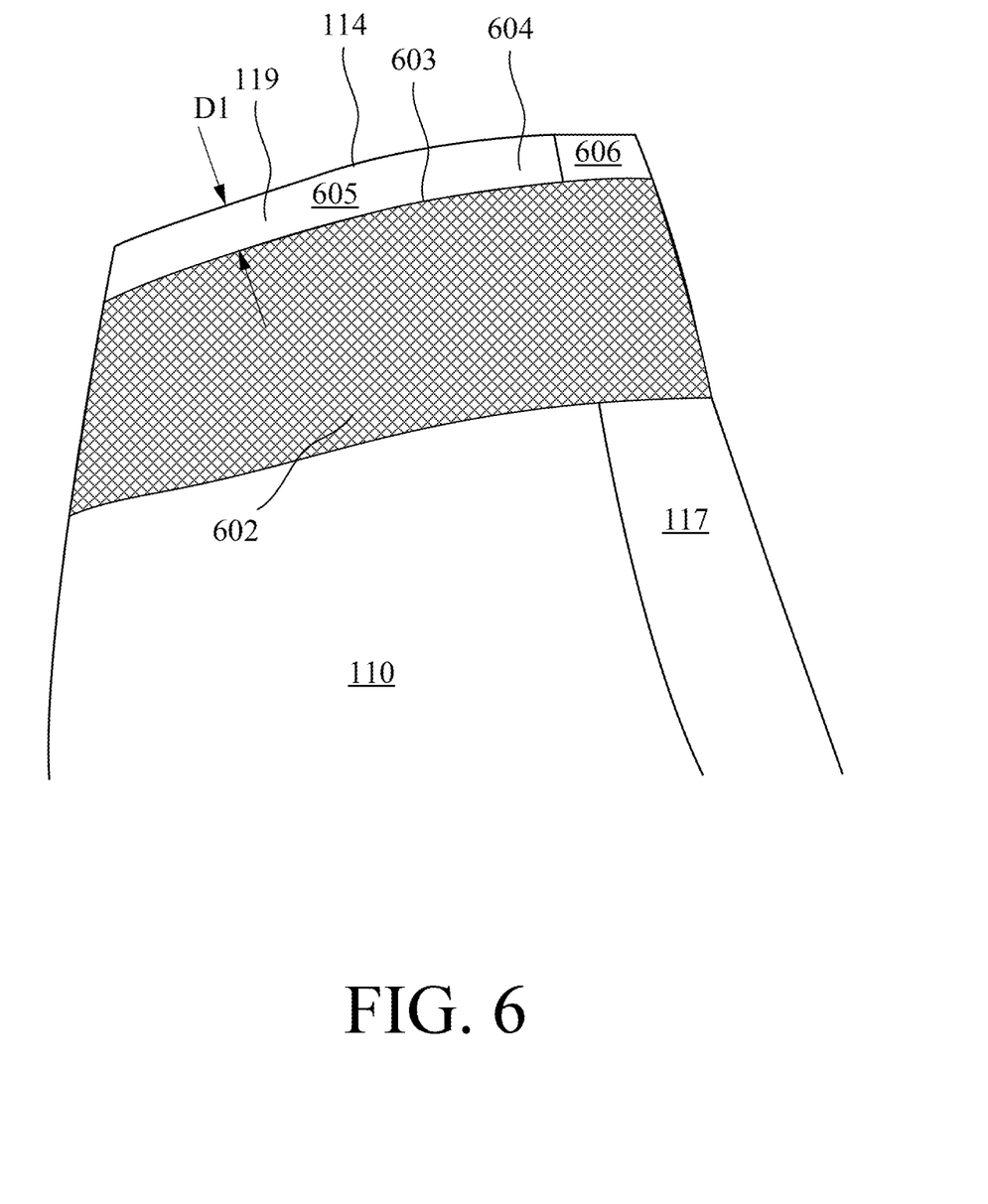
FIG. 6 illustrates an airfoil during a repair process, in accordance with various embodiments.

The method 500 further comprises masking a portion of the airfoil 110 (step 504). In various embodiments, by masking the portion of the airfoil 110 that is not being repaired (i.e., is adjacent to a repair area), the portion of the airfoil that is being masked may not be accidently damaged by any of the steps meant for the area being repaired. In various embodiments, both sides (e.g., the convex side 113 and the concave side 111) can be masked in accordance with step 504. In various embodiments, the leading edge cover 117 can be masked in accordance with step 504. Referring now to FIG. 6, a masked portion 602 of the airfoil 110 being repaired is illustrated, in accordance with various embodiments. An edge 603 of the masked portion 602 can be spaced apart from the tip 114 by a distance D1. In various embodiments, the distance D1 is between 0.75 inches (1.9 cm) plus or minus 0.2 inches (0.5 cm). However, the present disclosure is not limited in this regard and various masking distances are within the scope of this disclosure.

The method further comprises removing a paint from a repair area of the airfoil (step 506). In various embodiments, removing the paint can comprise plastic media blasting, sanding, aluminum oxide blasting, etc. Referring back to FIG. 6, the repair area includes an unmasked portion (e.g., repair area 604) of the airfoil 110. In various embodiments, the unmasked portion of the airfoil 110 include an unmasked portion 605 of the metallic body 119 disposed proximate the tip 114 and the tip 114. In various embodiments, the unmasked portion can further comprise an unmasked portion 606 of the leading edge cover 117 disposed proximate the tip 114. However, the present disclosure is not limited in this regard. For example, the leading edge cover 117 can also be masked in accordance with step 504 and still be within the scope of this disclosure. In various embodiments, removing the paint ensures that a bond in step 508 as described further herein bonds to the metallic body directly. In various embodiments, if the airfoil 110 is not painted, step 506 does not have to be performed.

In various embodiments, the method 500 further comprises preparing the repair area for bonding (step 508). In various embodiments, step 508 further comprises roughening a repair area (e.g., via etching or blasting processes). In various embodiments, the roughening of the repair area can be different or the same for a portion 605 of the repair area 604 corresponding to the metallic body 119 and the portion of the repair area 604 corresponding to the leading edge cover 117. The present disclosure is not limited in this regard. In various embodiments, after the repair area is prepared for bonding in step 508, the mask from step 504 can be removed.

In various embodiments, the method 500 further comprises coupling an abrasive component to the repair area of the airfoil (step 510). In various embodiments, the abrasive component comprises an emery cloth. Although described herein as comprising an emery cloth, the present disclosure is not limited in this regard. For example, any abrasive component having a flash point that is greater than 400° F. (204° C.) is within the scope of this disclosure. In various embodiments, the abrasive component comprises a backing paper and an abrasive coupled to the backing paper. In various embodiments, the abrasive component is coupled to the repair area via an adhesive and vacuum bagging process, as described further herein.

The method 500 further comprises painting at least a portion of the airfoil (step 512). The portion of the airfoil painted in step 512 can be a transition portion (i.e., the metallic body 119 below the abrasive component on the airfoil 110 and the abrasive component above the metallic body 119). In this regard, the paint over the transition portion can prevent an edge of the abrasive component from peeling over time, in accordance with various embodiments.

Figure 7:
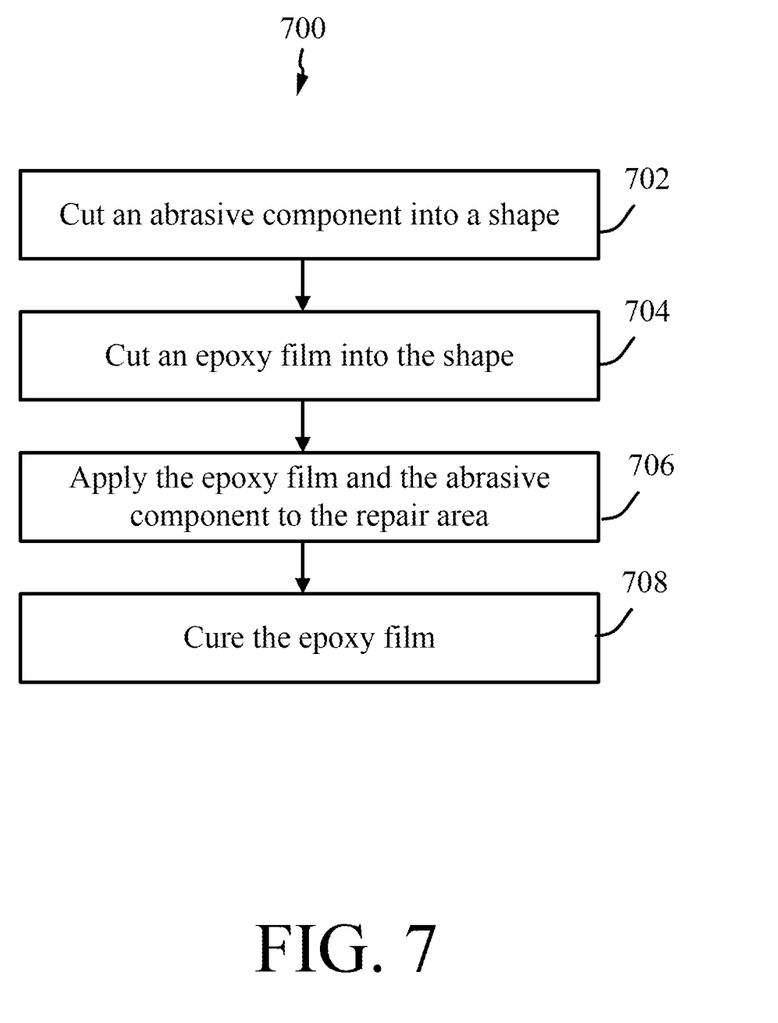
FIG. 7 illustrates a method of coupling an abrasive component to a tip of an airfoil, in accordance with various embodiments.

Referring now to FIG. 7, a method 700 for coupling the abrasive component in method 500 to the repair area of the airfoil (i.e., step 510 of method 500) is illustrated in accordance with various embodiments. The method 700 comprises cutting an abrasive component into a shape (step 702). With brief reference to FIG. 8, the abrasive component can be cutting template. For example, a cutting template 802 can be printed on an abrasive component 804. In this regard, the cutting template 802 can correspond to the shape of the abrasive component 804 used in the method 700.

Figure 8:
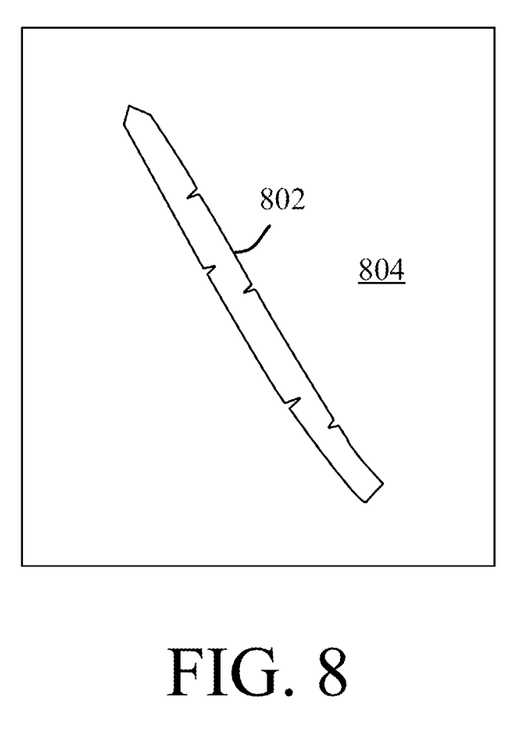
FIG. 8 illustrates an abrasive component prior to cutting, in accordance with various embodiments.

In various embodiments, the method 700 further comprises cutting an epoxy film into the shape (step 704). In various embodiments, the cutting template 802 as shown in FIG. 8 can be used on the epoxy film in a similar manner to generate an outline for the shape, in accordance with various embodiments.

Figure 9:
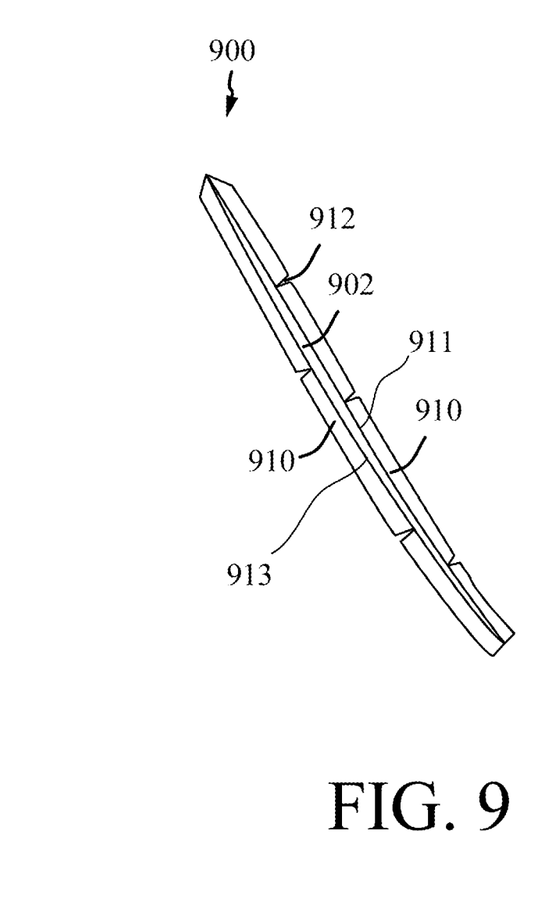
FIG. 9 illustrates a flat pattern of an abrasive component or an epoxy film, in accordance with various embodiments.

With brief reference to FIG. 9, a flat pattern 900 for a tip repair from steps 702, 704 of method 700 is illustrated, in accordance with various embodiments. In various embodiments, the flat pattern 900 comprises a tip panel 902 and a plurality of flaps 910 extending outward from the tip panel 902. The tip panel 902 can correspond (or mirror) a surface defined by the tip 114 of the airfoil 110 as described previously herein. In this regard, the tip panel 902 of the epoxy film is configured to interface with the tip 114 of the airfoil 110 and couple the tip panel 902 of the abrasive component as described further herein, in accordance with various embodiments. In various embodiments, adjacent flaps in the plurality of flaps 910 define notches 912 therebetween. The notches 912 between allow the flaps 910 to fold over one another and conform to either the concave side 111 or convex side 113 of the airfoil 110 that is being repaired, in accordance with various embodiments. Although illustrated as comprising flaps 910 extending from both a concave side edge 911 and the convex side edge 913, the present disclosure is not limited in this regard. For example, flaps 910 can extend from a single side edge (e.g., on the concave side edge 911), in accordance with various embodiments. In various embodiments, the flaps 910 can extend radially along the concave side 111 and prevent a shearing force on the tip panel 902 from degrading or removing the abrasive component as described further herein.

Figure 10A:
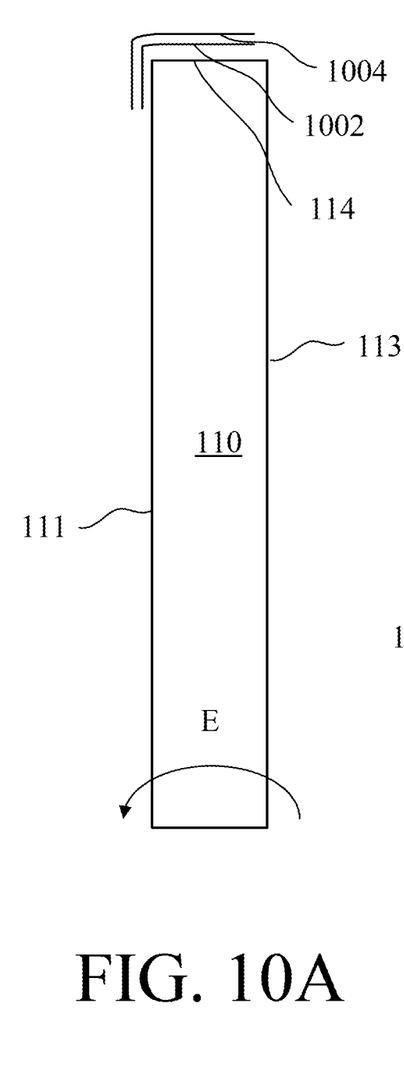
FIG. 10A illustrates a schematic view of repaired airfoil, in accordance with various embodiments.
Figure 10B:
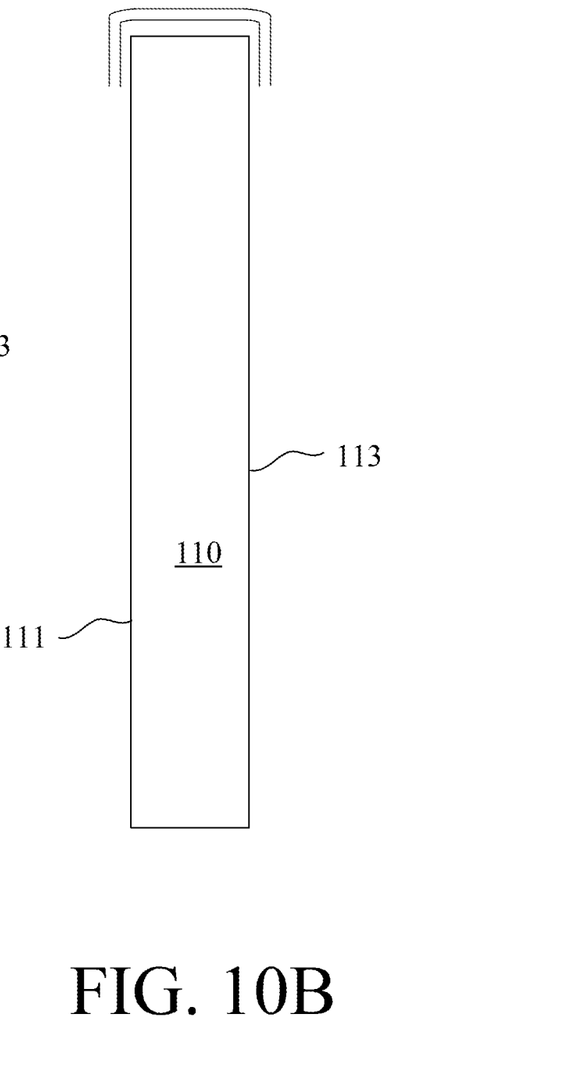
FIG. 10B illustrates a schematic view of repaired airfoil, in accordance with various embodiments.

Referring back to FIGS. 7, 10A, and 10B, method 700 further comprises applying the epoxy film 1002 and the abrasive component 1004 to the repair area of the airfoil 110 (step 706). Step 706 can comprise applying the epoxy film 1002 and the abrasive component 1004 to the tip 114 and the concave side 111 only as shown in FIG. 10A or to the tip 114, the concave side 111, and the convex side 113 as shown in FIG. 10B. The present disclosure is not limited in this regard. In various embodiments, although applying the epoxy film 1002 and the abrasive component 1004 to a single side in accordance with FIG. 10A can function well, applying the epoxy film 1002 and the abrasive component 1004 to both sides can provide a greater bond and may be easier to bond relative to only coupling to the abrasive component 1004 and the epoxy film 1002 to a single side. However, the present disclosure is not limited in this regard.

In various embodiments, the abrasive component 1004 and the epoxy film 1002 are on a forward side of the airfoil 110 (i.e., on a forward side of a direction of rotation E). In this regard, by disposing the abrasive component 1004 and the epoxy film 1002 partially along the forward side of the airfoil 110, a shearing force will be experienced by the abrasive component 1004 during operation (as opposed to a peeling force), which can prevent the abrasive component 1004 from being peeled, or partially peeled, off.

In various embodiments, the method 700 further comprises curing the epoxy film 1002 to bond the airfoil 110 to the abrasive component 1004 (step 708). In various embodiments, curing the epoxy film can comprise vacuum bagging the epoxy film 1002 and the abrasive component 1004 and applying heat to the epoxy film 1002 and the abrasive component 1004 to form bond the epoxy film 1002 to the airfoil 110 and the abrasive component 1004. In various embodiments, excess epoxy film 1002 can be removed by a deflashing process, or any other process known in the art. In various embodiments, any excess resin can be sanded off, or the like.

In various embodiments, a shape of the epoxy film 1002 is substantially similar to a shape of the abrasive component 1004. "Substantially similar," as referred to herein is having an outer profile that is within a profile (in a flat state) of between 0.001 inches (0.0254 mm) and 0.1 inches (2.54 mm), or between 0.01 inches (0.254 mm) and 0.05 inches (1.25 mm), or the like. However, the present disclosure is not limited in this regard.

Figure 11:
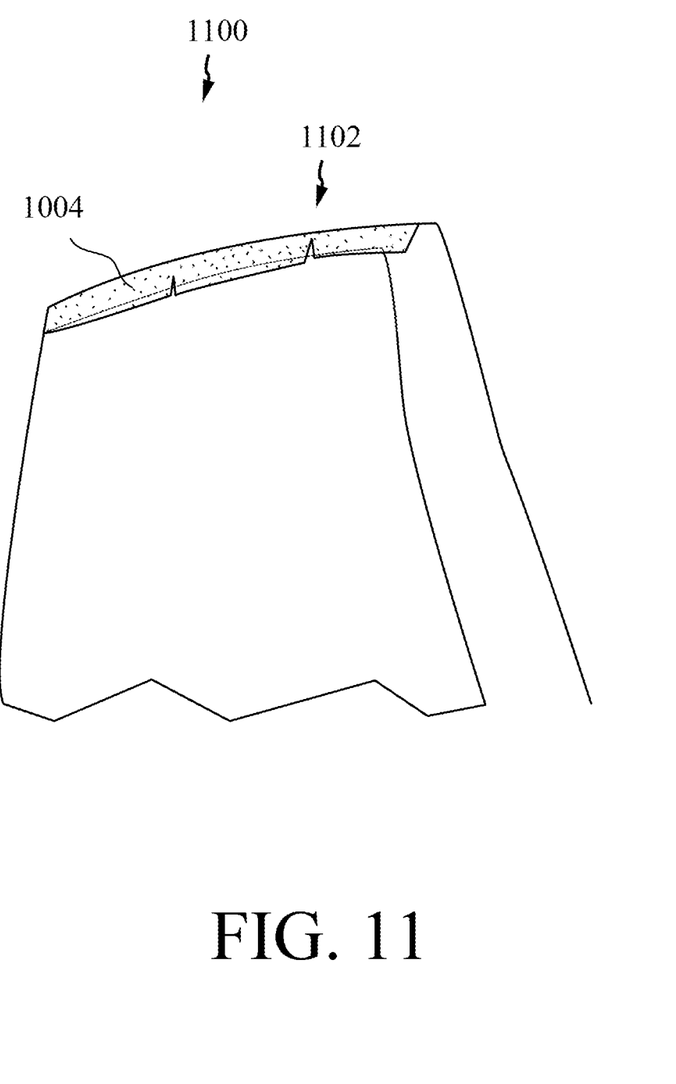
FIG. 11 illustrates a side view of a repaired airfoil, in accordance with various embodiments.

Referring now to FIG. 11, an airfoil 1100 with a repaired tip 1102 is illustrated, in accordance with various embodiments. In various embodiments, the repaired tip 1102 comprises an abrasive component 1004 and an epoxy film disposed between a tip of the airfoil 1100 and a backing sheet of the abrasive component 1004.

Figure 12:
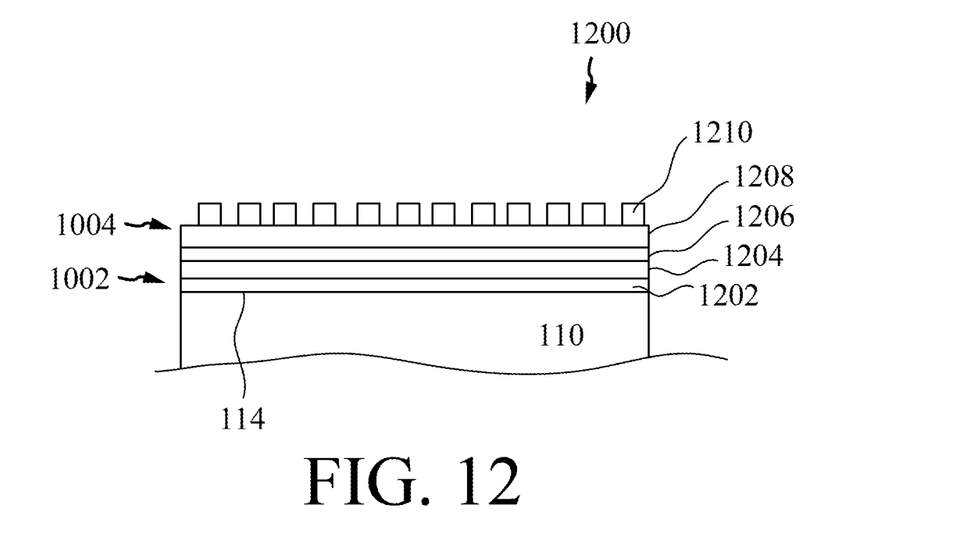
FIG. 12 illustrates a cross-sectional view of a repaired tip of an airfoil, in accordance with various embodiments.

Referring now to FIG. 12, a cross-sectional view of a repaired airfoil tip 1200 with the epoxy film 1002 and the abrasive component 1004 after being applied to a tip 114 of an airfoil 110 is illustrated, in accordance with various embodiments. In various embodiments, the epoxy film comprises a carrier layer 1204 disposed between adhesives 1202, 1206. In this regard, the carrier layer 1204 can be configured to strengthen the epoxy film 1002. In various embodiments, the carrier layer can be a fabric or the like. In various embodiments, the carrier layer 1204 can facilitate transfer of the epoxy film in sheet form for ease of handling and ease of use.

In various embodiments, the abrasive component 1004 comprises a backing sheet 1208 and a plurality of protrusions 1210 extending from the backing sheet 1208. In various embodiments, the backing sheet is paper, cloth, vulcanized fiber, polymeric films, or the like. The present disclosure is not limited in this regard. In various embodiments, the plurality of protrusions is an abrasive grain formed of any abrasive material, such as alumina, cubic boron nitride, silicon carbide, tungsten carbide, silicon nitride, or titanium diboride. The present disclosure is not limited in this regard. In various embodiments, the abrasive component 1004 includes a flash point that is greater than 400° F. (204° C.). In various embodiments, the abrasive grain is coupled to the backing sheet by an adhesive (e.g., an epoxy, glue, or the like).

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods, and apparatus are provided herein. In the detailed description herein, references to "one embodiment," "an embodiment," "various embodiments," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

Finally, it should be understood that any of the above described concepts can be used alone or in combination with any or all of the other above described concepts. Although various embodiments have been disclosed and described, one of ordinary skill in this art would recognize that certain modifications would come within the scope of this disclosure. Accordingly, the description is not intended to be exhaustive or to limit the principles described or illustrated herein to any precise form. Many modifications and variations are possible in light of the above teaching.

What is claimed is:

1. A method of repairing a tip of an airfoil, the method comprising:
   removing a coating from the tip of the airfoil;
   preparing a repair area for bonding, the repair area including the tip and a portion of a concave side of the airfoil;

applying an epoxy film and an abrasive component to the repair area, wherein the epoxy film comprises a carrier layer disposed between adhesives; and bonding the epoxy film and the abrasive component to the repair area.

2. The method of claim 1, wherein applying the epoxy film and the abrasive component comprises disposing the epoxy film between the repair area and the abrasive component.

3. The method of claim 1, wherein the epoxy film and the abrasive component have a substantially similar shape prior to applying the epoxy film and the abrasive component to the repair area.

4. The method of claim 1, wherein the abrasive component comprises a backing sheet and an abrasive grain.

5. The method of claim 1, wherein the abrasive component comprises an emery cloth.

6. The method of claim 1, wherein bonding the epoxy film and the abrasive component comprises vacuum bagging the repair area.

7. A method of coupling an abrasive component to a tip of an airfoil, the method comprising:

applying an epoxy film and the abrasive component to the tip of the airfoil, the epoxy film having a first shape defined by a tip panel and a plurality of flaps extending outward from a concave edge of the tip panel, the tip panel disposed between the tip and the abrasive component;

folding the plurality of flaps of the epoxy film over a concave side of the airfoil; and bonding the abrasive component to the airfoil via the epoxy film.

8. The method of claim 7, wherein the first shape further comprises a second plurality of flaps extending outward from a convex edge of the tip panel.

9. The method of claim 8, further comprising folding the second plurality of flaps over a convex side of the airfoil.

10. The method of claim 7, wherein the abrasive component comprises a second shape, and wherein the second shape is substantially similar to the first shape.

11. The method of claim 7, wherein bonding the abrasive component to the airfoil further comprises curing the epoxy film.

12. The method of claim 7, further comprising cutting the epoxy film into the first shape based on a template.

13. The method of claim 12, further comprising cutting the abrasive component into a second shape based on the template, wherein the second shape is substantially similar to the first shape.

14. A repaired airfoil, comprising:

an airfoil comprising a metallic body extending from a platform radially outward to a tip, the airfoil defining a concave side and a convex side;

an abrasive component comprising a backing sheet and an abrasive grain coupled to the backing sheet; and an epoxy film bonded to the backing sheet of the abrasive component and the tip of the airfoil, wherein the epoxy film further comprises a first flap extending over a portion of the concave side, the first flap coupled to the concave side and overlapping a second flap of the abrasive component.

15. The repaired airfoil of claim 14, wherein the epoxy film further comprises a third flap extending over a portion of the convex side, the third flap coupled to the convex side and overlapping a fourth flap of the abrasive component.

16. The repaired airfoil of claim 14, wherein the epoxy film comprises a carrier layer disposed between a first adhesive and a second adhesive.

17. The repaired airfoil of claim 16, wherein the first adhesive is disposed between the airfoil and the carrier layer, and wherein the second adhesive is disposed between the carrier layer and the backing sheet.

18. The repaired airfoil of claim 14, wherein the abrasive component comprises an emery cloth.

19. A method of repairing a tip of an airfoil, the method comprising:

removing a coating from the tip of the airfoil;

preparing a repair area for bonding, the repair area including the tip and a portion of a concave side of the airfoil;

applying an epoxy film and an abrasive component to the repair area, wherein the abrasive component comprises an emery cloth; and bonding the epoxy film and the abrasive component to the repair area.

20. A repaired airfoil, comprising:

an airfoil comprising a metallic body extending from a platform radially outward to a tip, the airfoil defining a concave side and a convex side;

an abrasive component comprising a backing sheet and an abrasive grain coupled to the backing sheet; and an epoxy film bonded to the backing sheet of the abrasive component and the tip of the airfoil, wherein the epoxy film comprises a carrier layer disposed between a first adhesive and a second adhesive.

21. A repaired airfoil, comprising:

an airfoil comprising a metallic body extending from a platform radially outward to a tip, the airfoil defining a concave side and a convex side;

an abrasive component comprising a backing sheet and an abrasive grain coupled to the backing sheet; and an epoxy film bonded to the backing sheet of the abrasive component and the tip of the airfoil, wherein the abrasive component comprises an emery cloth.

* * * * *